United States Patent
Biermann et al.

(10) Patent No.: US 6,968,935 B2
(45) Date of Patent: Nov. 29, 2005

(54) SHIFT ELEMENT SUB-ASSEMBLY FOR A TRANSMISSION

(75) Inventors: Eberhard Biermann, Ravensburg (DE); Georg Gierer, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/481,092

(22) PCT Filed: Jun. 25, 2002

(86) PCT No.: PCT/EP02/06983

§ 371 (c)(1), (2), (4) Date: Dec. 17, 2003

(87) PCT Pub. No.: WO03/004893

PCT Pub. Date: Jan. 16, 2003

(65) Prior Publication Data

US 2004/0182668 A1 Sep. 23, 2004

(51) Int. Cl.⁷ .............................................. F16D 25/10
(52) U.S. Cl. ..................... 192/86; 192/82 T; 192/87.16
(58) Field of Search ................................ 192/86, 87.11, 192/87.16, 82 T, 48.91; 475/146, 128; 188/71.5

(56) References Cited

U.S. PATENT DOCUMENTS

| | | | | |
|---|---|---|---|---|
| 2,433,052 A | * | 12/1947 | Kelley | 475/146 |
| 2,505,450 A | * | 4/1950 | Wemp | 192/82 T |
| 3,599,512 A | * | 8/1971 | Wayman | 475/146 |
| 3,877,321 A | * | 4/1975 | Storer, Jr. | 475/146 |
| 4,966,270 A | | 10/1990 | Rispeter et al. | 192/87.16 |
| 5,439,088 A | | 8/1995 | Michioka et al. | 195/85 AA |
| 5,928,104 A | * | 7/1999 | Kimura et al. | 475/318 |
| 6,305,517 B1 | * | 10/2001 | Cole | 192/48.91 |
| 6,595,339 B1 | | 7/2003 | Bauknecht et al. | 192/85 AA |

FOREIGN PATENT DOCUMENTS

| | | | |
|---|---|---|---|
| DE | 43 02 518 A1 | * | 8/1993 |
| DE | 199 32 614 A1 | * | 1/2001 |
| FR | 1434704 | * | 2/1966 |
| JP | 58-207533 A | * | 12/1983 |

OTHER PUBLICATIONS

Ehrlinger, Ing. (Grad.) Friedrich J. and Dipl. Ing. Walter Kuhn, "Des automatische ZF–Getriebe HP 500–Tail 2", *ATZ Automobiltechnische Zaltschrift* 79 (1977) 10, pp. 483–488.

* cited by examiner

*Primary Examiner*—Rodney H. Bonck
(74) *Attorney, Agent, or Firm*—Davis & Bujold, P.L.L.C.

(57) ABSTRACT

A shift element sub-assembly for a transmission having two axially adjacent shift elements (2, 3) that are located in a transmission housing (1). The discs of both shift elements (2, 3) lie axially adjacent in the interior of the disc carrier (4) and are separated from one another by a central partition (40) of the disc carrier (4). Each shift element (2, 3) has a piston (23, 33) and a closing pressure chamber (24, 34), and at least one resetting element (27, 37, 39) for resetting the piston. Additionally, each shift element (2, 3) has a secondary piston (26, 36), which acts on the discs of each shift element (2, 3) in opposition to a resetting force of the resetting element (27, 37, 39) of each shift element (2, 3), via the piston (23, 33) of each shift element (2, 3), and at least one resetting element (27, 37, 39) of the shift element sub-assembly is configured as a drain pressure chamber (27, 37) that can be hydraulically or pneumatically actuated.

9 Claims, 1 Drawing Sheet

SHIFT ELEMENT SUB-ASSEMBLY FOR A TRANSMISSION

This application is a national stage completion of PCT/EP02/06983 filed Jun. 25, 2002 which claims priority from German Application Serial No. 101 31 816.2 filed Jun. 30, 2001.

FIELD OF THE INVENTION

The invention concerns a shift element subassembly for a transmission as well as a method for controlling this shift element subassembly.

BACKGROUND OF THE INVENTION

Shift element subassemblies for transmissions, especially for automatic transmissions or automated shifting transmissions, are known in many ways. Thus, DE 199 32 614 A1 describes an arrangement of two axially adjacent shift elements constructed as a brake for a stepped automatic transmission. Here a joint disc carrier is provided for both brakes which is connected form-locking with the transmission housing and has a central partition axially between the two brakes. The pistons for hydraulic actuation of the respective brake are in each case arranged directly to the left and right of the partition, whereby one of the brakes is actuated through a double piston with two pressure chambers. Each brake has a resetting element constructed as a teller spring on a smaller diameter than the internal diameter of the disc, radially arranged beneath the disc friction area.

Friedrich J. Ehrlinger/Walter Kuhn, "The Automatic ZF Transmission HP 500" in ATZ *Automotive Engineering Journal* 79 (10) (1977), pp. 463–466 discloses a representative shift element subassembly of a stepped automatic transmission with two axially arranged adjacent transmission brakes which can be hydraulically actuated independently of each other. A joint disc carrier for accommodating the external discs of both brakes is provided for these two brakes. The discs of both brakes are arranged axially adjacent inside the disc carrier and are separated from each other by a central partition of the disc carrier. Both brakes respectively have a piston for hydraulic actuation which is in each case arranged on the side of the discs of the respective brake facing away from the partition. A joint resetting element constructed as a set of spiral springs is provided radially above the discs of both brakes for both pistons. The air-play adjustment of both brakes requires a plotting of the actual installation dimensions in the transmission housing.

The object of the invention is to perfect a shift element subassembly with two axially adjacent shift elements which can be actuated hydraulically or pneumatically independently of each other with respect to the smallest possible construction space and with respect to installation friendliness.

SUMMARY OF THE INVENTION

Proceeding from the state of the art, the shift element subassembly has two axially adjacent shift elements arranged in a transmission housing, which can be actuated hydraulically or pneumatically independently of each other. A joint disc carrier for both shift elements accommodates the external discs or the internal discs of both shift elements. The discs of both shift elements are arranged axially adjacent inside the disc carrier and are separated from each other by a central partition of the disc carrier. Each shift element has at least one piston and a closing pressure chamber for hydraulic or pneumatic actuation which is arranged on the side of the disc of the respective shift element facing away from the partition.

In accordance with the invention, each shift element has at least one resetting element for resetting the piston which is arranged in a correspondingly constructed recess in the disc carrier above the disc of the respective shift element, and at least one resetting element of the shift element subassembly is constructed as a drain pressure chamber which can be actuated hydraulically or pneumatically. Both shift elements respectively have a secondary piston for actuation in addition to the piston. The pistons are arranged axially directly alongside the disc carrier, respectively to the left and right of its front faces. The actuation pressure in the closing pressure chamber of the respective shift element acts directly on its piston, which then exerts a force on the secondary piston of the respective shift element that once again exerts an actuation force on the discs of the respective shift element against the force of the allocated resetting element.

Both secondary pistons are thus constructed in such a way that, on the one hand, a transmission of actuation pressure in the respective closing pressure chamber through the allocated piston on the discs of the respective shift element is possible, and on the other hand in such a way that the resetting force of the allocated resetting element acts through the secondary piston on the piston of the respective closing pressure chamber. For this reason, the secondary pistons open axially mobile into the recesses in the disc carrier where the resetting elements are also arranged. The axial displacement of the secondary pistons is respectively restricted by an adjusting ring in the disc carrier in such a way that the constructively specified air-play of the respective shift element is set. Appropriately a sufficiently broad groove is provided for this in the disc carrier. The air-play is then set through an adjusting ring width adapted to the actual component dimensions and component tolerances. In the open state of the shift element, its secondary piston is in its end position (as a consequence of the reset force of the allocated resetting element) that is specified by the adjusting ring owing to which the discs of the shift element have the specified air-play.

The disc carrier can thus be pre-assembled together with the discs, the resetting elements and the secondary piston as a subassembly element in an especially advantageous manner. When the entire shift element subassembly is completed in the transmission housing, an otherwise subsequent measurement of the actual installation dimensions of the shift elements in the installed state in the transmission housing is no longer necessary to ascertain the actual air plays. In the event that a correction of the air-plays to the constructively specified values is necessary, the requisite reassembly of the shift elements from transmission housing is dispensed with. Consequently a considerable facilitation of installation and a corresponding cost reduction is attained. As a consequence of the high power density of the hydraulic or pneumatic piston resetting apparatus, the shift element subassembly can be executed constructively in a very compact and space-saving advantageous manner.

Constructing the resetting elements of both shift elements respectively as drain pressure chambers is proposed in an especially space-saving design of the invention. Here the two shift elements can be opened hydraulically or pneumatically independently of each other whereby the closing pressure chambers that are subjected to pressure when the shift elements are closed are ventilated upon opening.

The shift elements of the subassembly can be constructed as a transmission clutch or a transmission brake. In an advantageous refinement of the invention, both shift elements are constructed as brakes, whereby the joint disc carrier of both brakes is constructed as an external disc carrier and is connected form-locking or also force-locking with the transmission housing, and whereby both closing pressure chambers are formed by a corresponding housing configuration directly through the transmission housing.

Subjection to pressure of the corresponding emptying pressure chamber for opening the respective shift element appropriately takes place through an electro-hydraulic transmission control apparatus through which the closing process of the shift element is also controlled. Moreover, the hydraulic or pneumatic opening of the shift element can in particular be controlled shifting-specific and/or temperature-dependent.

Providing at least one emptying diaphragm to influence the reduction of pressure in this closing pressure chamber is proposed as a suitable design of ventilation of the closing pressure chamber subjected to pressure upon closing. It can also be provided in another design of the ventilation that the pressure drop can be influenced electro-hydraulically, thus that the pressure reduction in the corresponding closing pressure chamber can be actively controlled through an electro-hydraulic control unit, in particular shift-specific and/or temperature-dependently.

The hydraulic or pneumatic opening of the shift element or both shift elements in accordance with the invention can also be supported by a spring force, whereby the corresponding shift element then has two parallel acting resetting elements. A combination of this design with an active control of the pressure reduction in the corresponding closing pressure chamber is beneficial. Presupposing a corresponding spring design, a retraction of the actuation into its initial position is then assured through the spring force even in the pressure less state of the transmission, whereby the spring force is appropriately set as low as possible. Due to subjecting the emptying pressure chamber to pressure and the controlled pressure reduction in the closing pressure chamber of the appropriate shift element, the opening of the shift element can advantageously be controlled very delicately sensitively, for example with shift-dependent different opening times for optimizing comfort of overlapping shiftings or for increasing the spontaneity of shifting sequences.

The pressure-modulated actuation of the closing pressure chamber and the empty pressure chamber as a differential pressure chamber is suggested even when closing the respective shift element is proposed in a further development of the invention. It would preferably be shift-dependent. In this way, the corresponding shift element can be controlled particularly delicately sensitively in an advantageous manner, for example when shifting very slight or even sharply different torques. The double piston principle is known, for example from DE 199 32 614 A1. In contrast with this state of the art, however, no additional component is necessary due the construction according to the invention of the resetting element as a drain pressure chamber whose drain pressure operates against a closing pressure. Of course, such a differential pressure control of closing pressure chamber and drain pressure chamber can also be used when opening the shift element, for example for delicately sensitive loosening of the force-lock at very slight differential torques on the shift element to be opened.

BRIEF DESCRIPTION OF THE DRAWING

The invention will now be described, by way of example, with reference to the accompanying drawings in which.

DETAILED DESCRIPTION OF THE INVENTION

Figure 1:
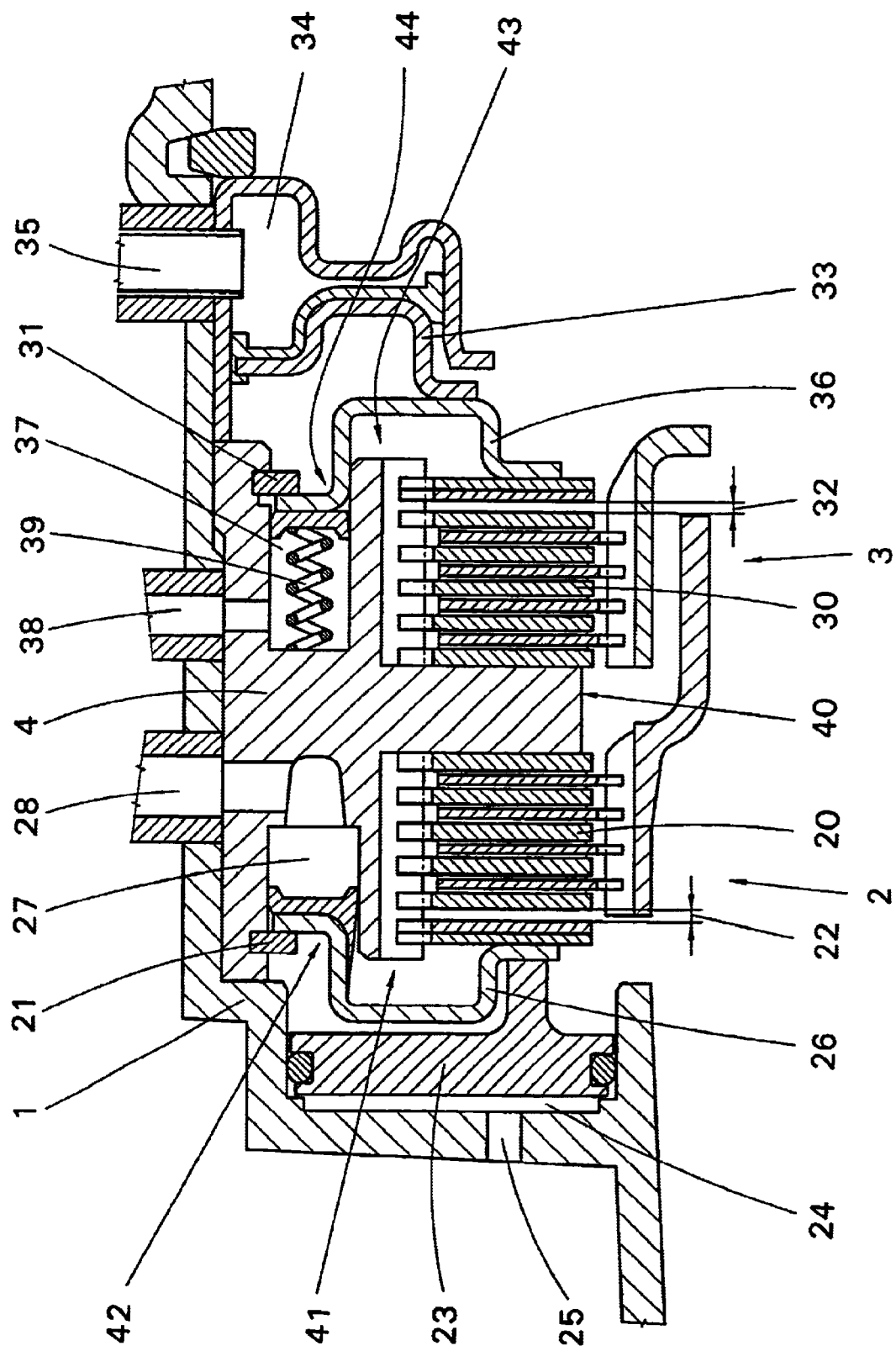
FIG. 1 is a schematic partial section of an advantageous design of the shift element of the invention.

A transmission housing 1 in which a first shift element 2 and a second shift element 3 are arranged. Both shift elements 2 and 3 are constructed as brakes in the design represented. A common disc carrier 4 is allocated to the two shift elements 2, 3, which is constructed as an external disc carrier in the design accommodating external discs 20 of the first shift element 2 and external discs 30 of the second shift element that is axially mobile in correspondingly constructed synchronization gearings. The discs of the two shift elements 2, 3 are arranged axially adjacent inside the joint disc carrier 4 and are separated from each other by a central separation wall 40 of the disc carrier 4.

The shift elements 2, 3 can be hydraulically or pneumatically actuated independently of each other. For this, a closing pressure chamber 24 is provided for the first shift element 2, which is incorporated into the component structure of the transmission housing 1 and can be subjected to pressure through a closing pressure feed 25. The closing pressure can be modulated preferably through an electro-hydraulic or electro-pneumatic transmission control apparatus, for example, as a function of the type of shifting, of the torque to be transmitted and/or as a function of temperature. The pressure in the closing pressure chamber 24 acts directly on a piston 23 of the first shift element 2. The piston 23 once again acts upon a secondary piston 26 of the first shift element 2, the secondary piston 26 then acts upon the discs of the first shift element 2. Closing pressure chamber 24, piston 23 and secondary piston 26 are arranged in the region of a first front face 41 of the disc carrier 4. To close the first shift element 2, the closing pressure chamber 24 is thus subjected to pressure and the secondary piston 26 is moved by the piston 23 against a resetting force of a resetting element 27 axially in the direction of the discs of the first shift element so that the torque of its discs can be transferred.

The hydraulically or pneumatically actuatable drain pressure chamber 27 is provided as a resetting element of the first shift element 2 which is arranged in a radial recess 42 on the first front face 41 of the disc carrier 4 radially above the discs of the first shift element 2, thus on a greater diameter than the discs. The drain pressure chamber 27 can be subjected to pressure through a drain pressure feed 28, preferably pressure modulated through the electro-hydraulic or electro-pneumatic transmission control apparatus, for example as a function of the type of shift and/or temperature.

A pressure reduction taking place in the closing pressure chamber 24 parallel to the pressure build up in the drain pressure chamber 27 can be influenced by one or more diaphragms, for example. The pressure reduction in the closing pressure chamber 24 can also be controlled pressure-modulated through the electro-hydraulic or electro-pneumatic transmission control apparatus, especially for temperature compensation of opening behavior.

That closing and/or opening of the first shift element 2 takes place through a differential pressure control of the closing pressure chamber 24 and the drain pressure chamber 27 can be provided in a further development of the invention, especially depending upon shifting type for an especially delicately sensitive shifting at very small or strongly different torques.

The secondary piston 26 of the first shift element 2 has a cylindrical segment which opens axially movable into the same radial recess 42 on the first front face 41 of the disc carrier 4 in which the drain pressure chamber 27 of the first shift element 2 is also arranged. The axial sliding path of the secondary piston 26 is restricted by an adjusting ring 21 which is arranged in a correspondingly constructed groove in the disc carrier 4 in the region of its first front face 41 such that the secondary piston 26 is braced against the adjusting ring 21 or lies on it in the opened state of the first shift element 2 as a consequence of the resetting force of the drain pressure chamber 27. In this end position of the secondary piston 26, with the shift element 2 opened, the discs of the first shift element 2 have a constructively specified air play 22.

The second shift element 3 is constructed similarly to the first shift element 2. A transmission housing-fast closing pressure chamber 34 of the second shift element 3 can be subjected to closing pressure through a closing pressure feed 35, preferably modularly controlled through the electro-hydraulic or electro-pneumatic transmission control apparatus, whereby this closing pressure acts directly upon a piston 33 of the second shift element 3, which then once again acts upon a secondary piston 36 of the second shift element 3 and shifts the discs of the second shift element 3 in a form-locking manner. The closing pressure chamber 34 is made of the piston 33 and a pot-like cylinder in the design represented which is connected fast with the transmission housing 1. In another design, the closing pressure chamber 34 of the second shift element 3 can also be incorporated into the transmission housing 1.

A combination of a drain pressure chamber 37 and a reset spring 39 are provided as a resetting element of the second shift element 3. The drain pressure chamber 37 and the reset spring 39 operate parallel and are both arranged together in a radial recess 44 in a second front face 43 of the disc carrier 4 radially above the discs of the second shift element 3, thus on a larger diameter than the discs. The drain pressure chamber 37 can be subjected to pressure through a drain pressure feed 38, preferably pressure-modulated through the electro-hydraulic or electro-pneumatic transmission control apparatus, for example, as a function of type of shifting and/or temperature.

The secondary piston 36 of the second shift element 3 has a cylindrical segment which opens axially movable into the same radial recess 44 on the second front face 43 of the disc carrier 4 in which the drain pressure chamber 37 and the resetting spring 39 of the second shift element 3 are also arranged. The axial displacement path of the secondary piston 36 is restricted by an adjusting ring 31 which is arranged in a groove in the disc carrier 4 in the region of its second front face 43 such that the secondary piston 36 is in an end position in which the secondary piston 36 is braced against the adjusting ring 31, or lies on the latter in the open state of the second shift element 3 as a consequence of the return forces of the drain pressure chamber 37 and the return spring 39. In this end position of the secondary piston 36, the discs of the second shift element 3 have a constructively specified air play 32.

Assuming a corresponding design of the return spring 39, the parallel connection of drain pressure chamber 37 and return spring 39 as a resetting element for the second shift element 3 makes possible a resetting of secondary piston 36 and piston 33 in the pressure less state of the transmission, whereby the spring force of the return spring 39 is appropriately designed low. Likewise the parallel connection of drain pressure chamber 37 and return spring 39 supports the differential pressure control of closing pressure chamber 34 and drain pressure chamber 37, especially in operating areas of the electro-hydraulic or electro-pneumatic transmission control unit with unfavorable resolution of control magnitude on pressure, for example at a very low pressure level.

Basically the same thing applies for the actuation possibilities of the second shift element 3 as for the actuation possibilities of the first shift element 2.

Owing to the constructive structure of the exemplary shift element subassembly, the disc carrier 4 can be pre-assembled with the discs correctly set as to air play of both shift elements 2 and 3, the resetting elements of both shift elements 2 and 3, the secondary pistons 26 and 36, as well as the adjusting rings 21 and 31 as a subassembly. In this way, the installation of the transmission is considerably facilitated since an adjustment of the air plays 22 and 32 to the component tolerances of the transmission housing 1 or the housing elements which are relevant for the function of the two shift elements 2 and 3 is no longer necessary. Moreover, the construction of the resetting elements as drain pressure chambers 27, 37 which can be actuated hydraulically or pneumatically makes possible a very compact construction of the shift element subassembly as a consequence of the high power density of this actuation.

Obviously the resetting elements of the individual shift elements can be combined otherwise in other designs of the shift element subassembly of the invention. For example, both shift elements can respectively have a hydraulically or pneumatically actuatable drain pressure chamber without a return spring, or both shift elements can respectively have a reset spring in addition to the respective drain pressure chamber. It can also be provided that only one of the two shift elements has a drain pressure chamber which can be actuated hydraulically or pneumatically (without or with additional return spring), while the piston reset of the other shift element takes place in a conventional manner only through a spring element. The shift elements can also be constructed as a clutch with corresponding constructive configuration of the pistons and their pressure chambers.

Reference Numerals

1 Transmission housing
2 First shift element
20 External disc of the first shift element
21 Adjusting ring of the first shift element
22 Air play of the first shift element
23 Pistons of the first shift element
24 Closing pressure chamber of the first shift element
25 Closing pressure feed of the first shift element
26 Secondary pistons of the second shift element
27 Drain pressure (resetting element) of the first shift element
28 Drain pressure feed of the first shift element
3 Second shift element
30 External disc of the second shift element
31 Adjusting ring of the second shift element
32 Air play of the second shift element
33 Pistons of the second shift element
34 Closing pressure chamber of the second shift element
35 Closing pressure feed of the second shift element
36 Secondary pistons of the second shift element
37 Drain pressure (resetting element) of the second shift element
38 Drain pressure feed of the second shift element
39 Return spring (resetting element) of the second shift element 4 Disc carrier
40 Partition of the disc carrier
41 First front face of the disc carrier
42 Radial recess on the first front face of the disc carrier
43 Second front face of the disc carrier
44 Radial recess on the second front face of the disc carrier

What is claimed is:

1. A shift element subassembly for a transmission with two axially adjacent shift elements (2, 3) which can be actuated hydraulically or pneumatically, and arranged in a transmission housing (1) with a common disc carrier (4) for accommodating external discs (20, 21) or internal discs of both shift elements (2, 3), whereby the discs of both shift elements (2, 3) a rearranged axially adjacent inside the disc carrier (4) and are separated from each other by a central partition (40) of the disc carrier (4), whereby each shift element (2, 3) has a piston(23, 33) and a closing pressure chamber (24, 34) for actuation, which are arranged on the side of the disk of the respective shift element (2, 3) facing away from the partition (40) in the region of the front faces (41, 43) of the disc carrier (4), wherein each shift element (2, 3) has at least one resetting element (27, 37, 39) for piston resetting which is arranged in the disc carrier (4) radially above the discs of the respective shift element (2, 3), wherein each shift element (2, 3) has an additional secondary piston (26, 36) that acts through the piston (23, 33) of the respective shift element (2, 3) against a resetting force of the resetting element (27, 37, 39) of the respective shift element (2, 3) on the discs of the respective shift element (2, 3), and wherein the resetting elements (27, 37, 39) operate independently of one another and at least one resetting element (27, 37, 39) of the shift element subassembly is constructed as a drain pressure chamber (27, 37).

2. The shift element subassembly according to claim 1, wherein recesses (42, 44) are provided in a region of the front faces (41, 43) of the disc carrier (4) in a peripheral direction in which the resetting elements (27, 37, 39) allocated to the shift elements (2, 3) are arranged and into which the secondary pistons (26, 36) allocated to the shift elements (2, 3) open axially displaceably.

3. The shift element subassembly according to claim 2, wherein an adjusting ring (21, 31) allocated to the respective shift element (2, 3) is provided in the region of the front faces (41, 43) of the disc carrier (4) on which the secondary piston (26, 36) of the respective shift element (2, 3) when the shift element (2, 3) is open, whereby the discs of this shift element (2, 3) moreover have a specified air play (22, 32).

4. The shift element subassembly according to claim 2, wherein the disc carrier (4) can be pre-assembled with the discs of both shift elements (2, 3), the secondary pistons (26, 36) and the adjusting rings (21, 31) as a subassembly element, whereby the air plays of the respective discs can be adjusted over variously wide adjustment rings (21, 31).

5. The shift element subassembly according to claim 2, wherein the shift elements (2, 3) are constructed as brakes, whereby their common disc carrier (4) is constructed as an external disc carrier and is connected by one of form-locking or force-locking with the transmission housing (1).

6. A method for controlling the shift element subassembly for a transmission with two axially adjacent shift elements (2, 3) which can be actuated hydraulically or pneumatically and arranged in a transmission housing (1) with a common disc carrier (4) for accommodating external discs (20, 21) or internal discs of both shift elements (2, 3), whereby the discs of both shift elements (2, 3) are arranged axially adjacent inside the disc carrier (4) and are separated from each other by a central partition (40) of the disc carrier (4), whereby each shift elements (2, 3) has a piston (23, 33) and a closing pressure chamber (24, 34) for actuation which are arranged on the side of the disk of the respective shift element (2, 3) facing away from the partition (40) in the region of the front faces (41, 43) of the disc carrier (4), the method comprising the steps of:

independently resetting each shift element (2, 3) by positioning at least one resetting element (27, 37, 39) for piston resetting arranged in the disc carrier (4) radially above the discs of the respective shift element (2, 3), providing each shift element (2, 3) with an additional secondary piston (26, 36) that acts through the piston (23, 33) of the respective shift element (2, 3) against a resetting force of the resetting element (27, 37, 39) of the respective shift element (2, 3) on the discs of the respective shift element (2, 3), and constructing at least one resetting element (27, 37, 39) of the shift element subassembly as a drain pressure chamber (27, 37), and actuating the drain pressure chamber (27, 37) with modulatable pressure according to at least one of a specific shift and temperature.

7. The method for controlling the shift element subassembly according claim 6, further comprising the step of:

controlling the pressure reduction in the closing pressure chamber (24, 34) when opening the shift elements (2, 3) according to one of a specific shift and depending upon temperature.

8. The method for controlling the shift element subassembly according claim 6, further comprising the step of:

controlling the closing pressure chamber (24, 34) and drain pressure chamber (27, 37) by pressure-modulation, as a differential pressure chamber upon at least one of closing and opening the respective shift element (2, 3) as a of a specific shift.

9. A shift element subassembly for a transmission comprising:

a first and a second axially adjacent shift elements (2, 3) which can be actuated hydraulically or pneumatically, and arranged in a transmission housing (1) with a common disc carrier (4) for accommodating external discs (20, 21) or internal discs of both shift elements (2, 3), the discs of both shift elements (2, 3) are arranged axially adjacent inside the disc carrier (4) and are separated from each other by a central partition (40) of the disc carrier (4), said first and second shift elements (2, 3) further comprising:

a first and a second piston (23, 33) and a closing pressure chamber (24, 34) for actuation of the respective shift element (2, 3), which are arranged on the side of the disk of the respective shift element (2, 3) facing away from the partition (40) in the region of the front faces (41, 43) of the disc carrier (4);

a first resetting element (27) arranged in the disc carrier (4) radially above the discs of the first shift element (2, 3) for resetting the respective piston of the first shift element (2);

a second resetting element (37) arranged in the disc carrier (4) radially above the discs of the second shift element (2, 3) for resetting the respective piston of the second shift element (3);

a first secondary piston (26, 36) that acts through the first piston (23) of the first shift element (2, 3) against a resetting force of the first resetting element (27) on the discs of the first shift element (2), a second secondary piston (36) that acts through the second piston (33) of the second shift element (3)

against a resetting force of the second resetting element (27) on the discs of the second shift element (3), and wherein the first and second resetting elements (27, 37, 39) operate independently of one another on their respective first and second shift elements (2, 3) and at least one of the first and second resetting elements (27, 37) is constructed as a drain pressure chamber (27, 37).

* * * * *